(12) United States Patent
Sonobe et al.

(10) Patent No.: US 9,459,880 B2
(45) Date of Patent: Oct. 4, 2016

(54) INFORMATION PROCESSING APPARATUS AND OUTPUT CONTROL METHOD

(71) Applicant: KABUSHIKI KAISHA TOSHIBA, Tokyo (JP)

(72) Inventors: Hajime Sonobe, Tachikawa (JP); Hiroaki Chiba, Sagamihara (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 246 days.

(21) Appl. No.: 14/230,951

(22) Filed: Mar. 31, 2014

(65) Prior Publication Data

US 2015/0006872 A1    Jan. 1, 2015

(30) Foreign Application Priority Data

Jun. 28, 2013   (JP) ................... 2013-137225

(51) Int. Cl.
| | | |
|---|---|---|
| *G06F 9/00* | (2006.01) | |
| *G06F 15/177* | (2006.01) | |
| *G06F 9/44* | (2006.01) | |
| *G06F 3/14* | (2006.01) | |

(52) U.S. Cl.
CPC ............... *G06F 9/4401* (2013.01); *G06F 3/14* (2013.01)

(58) Field of Classification Search
CPC ........... G06F 1/24; G06F 3/14; G06F 9/4401
USPC ....................................................... 713/1, 2
See application file for complete search history.

(56) References Cited

U.S. PATENT DOCUMENTS

| | | | | |
|---|---|---|---|---|
| 7,017,035 B2* | 3/2006 | Nalawadi | ............ | G06F 1/3203 |
| | | | | 713/1 |
| 2004/0178968 A1 | 9/2004 | Kizaki | | |
| 2008/0272984 A1 | 11/2008 | Kizaki | | |
| 2009/0160733 A1 | 6/2009 | Chiba | | |
| 2011/0063193 A1 | 3/2011 | Kizaki | | |
| 2011/0063531 A1 | 3/2011 | Kizaki | | |
| 2014/0379951 A1* | 12/2014 | Taki | ............... | G06F 13/4068 |
| | | | | 710/303 |

FOREIGN PATENT DOCUMENTS

| | | |
|---|---|---|
| JP | 2004-271987 | 9/2004 |
| JP | 2008-102462 | 5/2008 |
| JP | 2009-151242 | 7/2009 |

\* cited by examiner

*Primary Examiner* — Mark Connolly
(74) *Attorney, Agent, or Firm* — Knobbe Martens Olson & Bear LLP

(57) ABSTRACT

An information processing apparatus includes a BIOS, a setting module, a determination module and a display controller. The setting module sets a display priority order at booting in the BIOS. The determination module determines connection of display units in order of priority based on the display priority order. The display controller performs a shortest waiting operation based on the connection determination and executes a display operation. An information processing apparatus having a screen display output includes a control program, a setting module, a determiner and a display controller. The setting module sets a display priority order at booting in the control program. The determiner determines whether display units are connected, in order of priority based on the display priority order. The display controller performs a shortest waiting operation based on the connection determination and executes a display operation.

7 Claims, 9 Drawing Sheets

*FIG. 3A*

| PRIORITY ORDER: ANALOG RGB > HDMI > DP |||||
|---|---|---|---|---|
| FIRST MUX CONTROL SIGNAL | SECOND MUX CONTROL SIGNAL | FIRST MUX OUTPUT DIRECTION | SECOND MUX OUTPUT DIRECTION | VIDEO SIGNAL OUTPUT TERMINAL |
| HPL_RGB | HPL_HDMI | | | |
| 0 | 0 | 0 | 0 | DP SOCKET |
| 0 | 1 | 0 | 1 | HDMI SOCKET |
| 1 | – | 1 | – | RGB SOCKET |

*FIG. 3B*

| PRIORITY ORDER: ANALOG RGB > DP > HDMI |||||
|---|---|---|---|---|
| FIRST MUX CONTROL SIGNAL | SECOND MUX CONTROL SIGNAL | FIRST MUX OUTPUT DIRECTION | SECOND MUX OUTPUT DIRECTION | VIDEO SIGNAL OUTPUT TERMINAL |
| HPL_RGB | HPL_DP | | | |
| 0 | 0 | 0 | 0 | HDMI SOCKET |
| 0 | 1 | 0 | 1 | DP SOCKET |
| 1 | – | 1 | – | RGB SOCKET |

FIG. 6

| DISPLAY UNIT | TIME REQUIRED FOR DETECTION |
|---|---|
| DP1 | 400ms |
| DHMI | 800ms |
| DP2 | 400ms |
| DVI | 400ms |
| RGB | 1350ms |

FIG. 7

| BIOS SETTING | PRIORITY 1 | PRIORITY 2 | PRIORITY 3 | PRIORITY 4 | PRIORITY 5 |
|---|---|---|---|---|---|
| AUTO SELECT | LCD | DP1/2 | HDMI | DVI | RGB |
| LCD | LCD | — | — | — | — |
| DP | DP1/2 | LCD | HDMI | DVI | RGB |
| HDMI | HDMI | LCD | DP1/2 | DVI | RGB |
| DVI | DVI | LCD | DP1/2 | HDMI | RGB |
| RGB | RGB | LCD | DP1/2 | HDMI | DVI |

INFORMATION PROCESSING APPARATUS AND OUTPUT CONTROL METHOD

CROSS-REFERENCE TO RELATED APPLICATION(S)

This application is based upon and claims the benefit of priority from Japanese Patent Application No. 2013-137225, filed on Jun. 28, 2013, the entire contents of which are incorporated herein by reference.

FIELD

Embodiments described herein relate generally to an information processing apparatus and an output control method.

BACKGROUND

A graphics processing unit (GPU) is incorporated in a central processing unit (CPU) that is a main processor of a personal computer (PC). Most notebook PC models use an internal GPU (hereinafter, referred to as an iGPU) incorporating a processor. A notebook PC is provided with an internal LCD, an external analog RGB output, an HDMI (registered trademark, omitted hereinafter) output and the like. These outputs are assumed by a display circuit composed mainly of an iGPU.

Some PC models are externally provided with a discrete GPU (hereinafter, referred to as a dGPU). However, a dGPU performs only so-called 3D operations represented by polygon processing, texture pasting, and light source or shading. A hybrid graphics function performed by an iGPU has been mainly used as a screen drawing function for a display output unit such as an internal LCD. Thus, all display outputs are basically governed by an iGPU.

A conventional display unit has four or more display output ports, and a GPU output can be used directly for an internal LCD, an external DP, an external HDMI, and an external RGB. Specifically, in the cases of a DP, HDMI or RGB displays being connected as an external display unit, the GPU can immediately recognize each connection. Further, as for those displays showing their logos at the system power start-up time, it is possible to select a suitable display unit without specific concern of time.

An iGPU for a notebook PC is conventionally provided with an analog RGB output function in it. When this function is disabled, however, an external IC comes to be required to convert a digital display output to an analog RGB output. Therefore, for supporting an analog RGB output function with such an iGPU, an analog RGB output function is realized by providing a notebook PC with an IC that converts a DP signal to an analog RGB signal, if the iGPU has a digital display output function at its Display Port (hereinafter, referred to as a DP).

Such an IC detects connection of an analog RGB display unit upon its connection being made at an analog RGB output terminal, reads in an extended display identification data (EDID) such as resolution and refresh rate, and initializes itself in accordance with the connected display unit to obtain an appropriate DP output from an iGPU. The initialization requires about one second, and after completion of the initialization, the IC asserts a hot plug detect (hereinafter, referred to as a HPD) signal indicating that an external display unit becomes usable for an iGPU.

Thus, at the time where a conventional iGPU had an analog RGB output function, the iGPU can detect an external display unit immediately after connection. But, as for recent iGPU, an external display unit might be detected about one second after being connected.

Immediately after the PC is powered on, a display unit displays a user setting, and a logo window or a boot window that were previously selected according to a priority order specified by an OS. In a model supporting an analog RGB output, even when a user has previously connected an analog RGB with setting an analog RGB display as a preferential display unit, initialization of DP/analog RGB conversion IC would not be completed at the timing of BIOS (Basic Input and Output system) processing to show the selections of a boot display device after power-on since HPD would not be asserted. Thus, an iGPU does not detect an external analog RGB, and a logo is displayed in a display unit such as originally asserted as the next display priority (an internal LCD and the like).

There has been a demand for appropriate analog RGB display, but a means to realize such a demand has not been known.

BRIEF DESCRIPTION OF THE DRAWINGS

FIGS. 3A and 3B show explanation drawings showing examples of operation of a signal conversion unit in a case where connection of an RGB socket is given top priority.

FIG. 6 is a diagram showing the time required for detection of each display unit via a conversion IC/ReDriver IC of the embodiment.

FIG. 7 is a diagram showing priority setting of BIOS startup display units and display priority used in the embodiment.

DETAILED DESCRIPTION

According to one embodiment, an information processing apparatus includes a BIOS, a setting module, a determination module and a display controller. The setting module sets a display priority order at booting in the BIOS. The determination module determines connection of display units in order of priority based on the display priority order. The display controller performs a shortest waiting operation based on the connection determination and executes a display operation.

Various Embodiments will be described hereinafter with reference to the accompanying drawings.

(First Embodiment)

A first embodiment will be explained with reference to FIG. 1 to FIG. 8.

An expansion apparatus (so-called Docker) according to the embodiment is an apparatus, which expands a functionality of an electronic apparatus with having a video output terminal in conformity to a plurality of standards, and handles a signal line related to a video signal to be electrically connected to the electrical apparatus via a connection terminal. The signal line comprises lines of the number in conformity to a predetermined video signal standard. In the following explanation, a notebook personal computer (hereinafter, referred to as a notebook PC) is described as an example of an electronic apparatus to be connected to an expansion apparatus according to the embodiment. An electronic apparatus as an information processing unit is not limited to a notebook PC, but may be any device having a video signal output function, such as a personal digital assistant (PDA), a portable game machine, a portable music player, a portable movie player, and so on.

(1) Typical Configuration of Hardware

Figure 1:
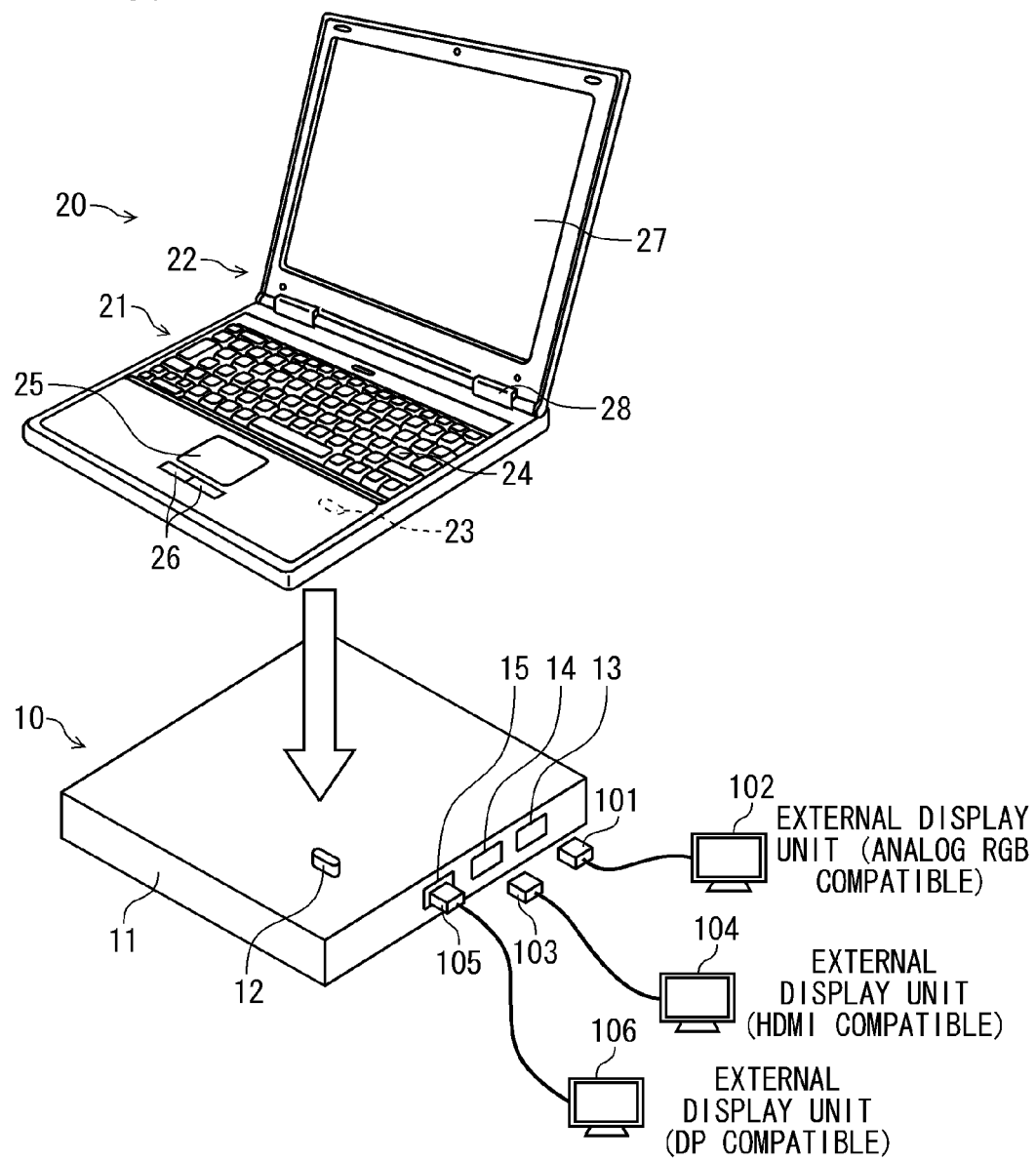
FIG. 1 is an overall perspective view showing an exemplary configuration of an expansion apparatus according to an embodiment and a notebook PC as an electronic apparatus connected to the expansion apparatus.

FIG. 1 is an overall perspective view showing an exemplary configuration of an expansion apparatus 10 according to a first embodiment and a notebook PC 20 as an electronic apparatus connected to the expansion apparatus 10.

The expansion apparatus 10 is an apparatus, which is provided with a functionality to be extended for extending a function usable by a user while ensuring portability of the notebook PC 20, and is comprised of a base part 11 enclosing various circuits, and an expansion side connection terminal 12 for electrically connecting the notebook PC 20. Further, as shown in FIG. 1, the embodiment is explained as an example, in which the expansion apparatus 10 comprises a video output terminal (an RGB socket, connector) 13 in conformity to the analog RGB standard defined by the Video Electronics Standards Association (VESA), an HDMI socket (connector) 14 in conformity to the High-Definition Multimedia Interface Standard, and a video output terminal (a DP socket, connector) 15 in conformity to the DisplayPort Standard (DP Standard). One more DP socket, or a DVI socket may be provided (not shown to avoid complication).

An RGB plug 101 is connected to the RGB socket 13. The RGB socket 13 outputs a video signal corresponding to the analog RGB standard to an external display unit 102 (a monitor display), which is connected to the RGB plug 101, and conforms to the analog RGB standard, via the RGB plug 101.

An HDMI plug 103 is connected to the HDMI socket 14. The HDMI socket 14 outputs a video signal corresponding to the HDMI standard to an external display unit 104, which is connected to the HDMI plug 103, and conforms to the HDMI standard, via the HDMI plug 103. ADP plug 105 is connected to the DP socket 15. The DP socket 15 outputs a video signal corresponding to the DP standard to an external display unit 106, which is connected to the DP plug 105, and corresponds to the DP standard.

The notebook PC 20 is composed of a computer main body 21, and a display unit 22 as a display. The computer main body 21 has a low-profile housing. On the bottom of the housing, there is provided a PC side connection terminal 23 that is electrically connectable to an expansion side connection terminal 12 of the expansion apparatus 10. The expansion side connection terminal 12 and PC side connection terminal 23 are so configured that, for example, one has a convex shape projecting to a certain length from the housing of one of the expansion apparatus 10 and notebook PC 20, while the other has a concave shape to fit with one of the expansion side connection terminal 12 and PC side connection terminal 23.

In the central portion of the top of the housing of the computer main body 21, a keyboard 24 is provided as an operation unit. In the front side of the top of the housing, a palm rest is formed. At almost the center of the palm rest, a touch-pad 25 and a touch pad button 26 are provided as an operation unit. On the other hand, the display unit 22 is provided with a display panel 27, and is connected to the computer main body 21 via a connection part (a hinge) 28 which supports opening and closing of the display panel.

The controller (the keyboard 24, touch-pad 25, and touch-pad button 26) applies an operation signal entered by a user to a main controller 32 (not shown) inside the computer main body 21 of a notebook PC. The display panel 27 comprises a common display output unit, such as, a liquid crystal display, an organic light emitting diode (OLED) display, and a light-emitting diode, and displays various information under the control of the main controller 32.

Figure 2:
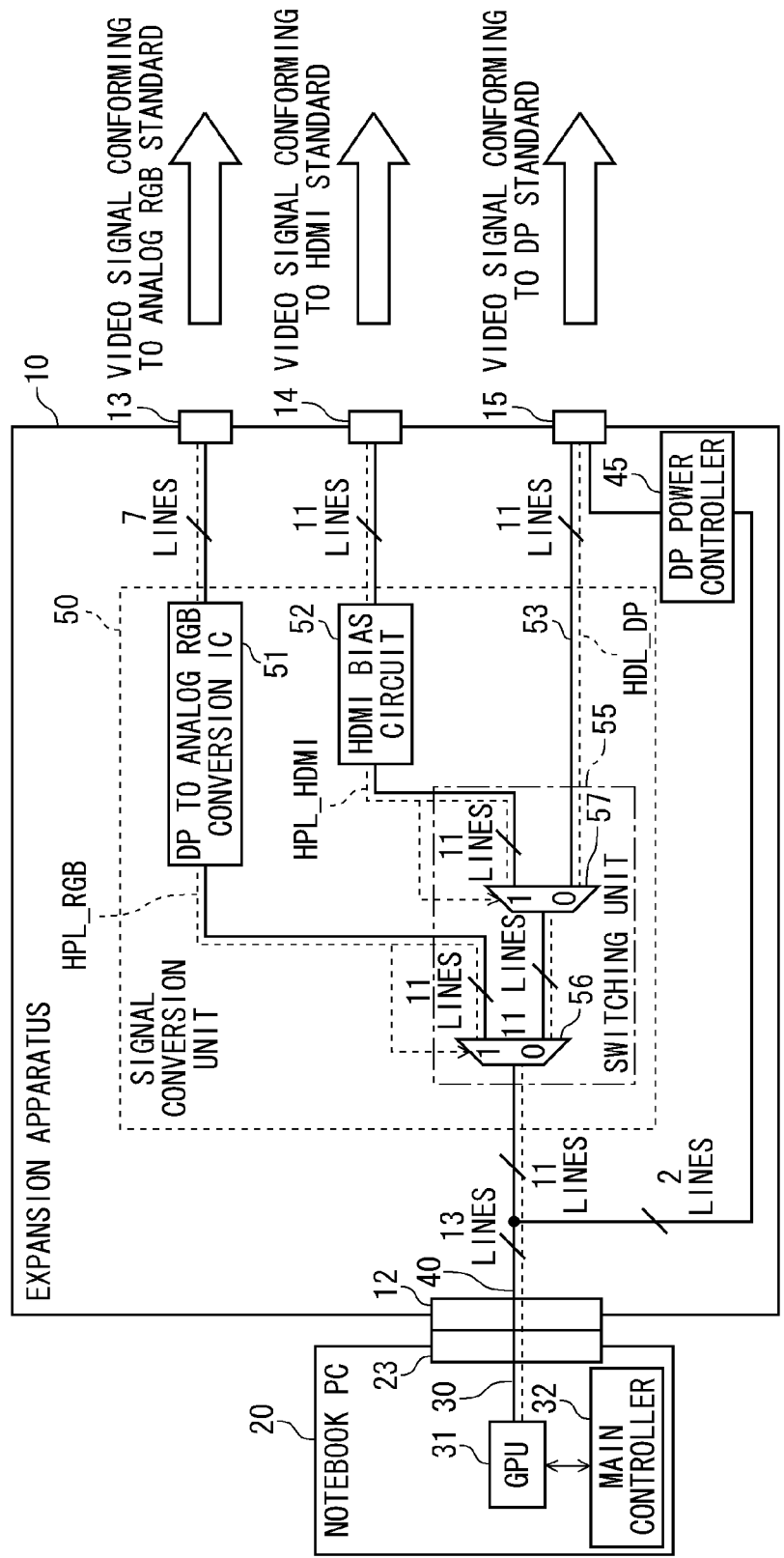
FIG. 2 is a block diagram schematically showing an example of internal configuration of the expansion apparatus and notebook PC shown in FIG. 1.

FIG. 2 is a block diagram schematically showing an example of internal configuration of the expansion apparatus 10 and notebook PC 20 shown in FIG. 1. As shown in FIG. 2, the notebook PC 20 further comprises a signal line 30 having at least the minimum number of lines in conformity to a predetermined video signal standard, a graphics processing unit (GPU) 31 that is a graphics controller having an image processing function, and a main controller 32. The GPU 31 is controlled by the main controller 32, and outputs a video signal in conformity to a predetermined video signal standard to the expansion apparatus 10 via the signal line 30 and the PC side connection terminal 23 connected to the signal line 30. The main controller 32 comprises a CPU, and a storage medium such as a RAM and a ROM, and controls the operation of the notebook PC 20 according to a program which is stored in the storage medium.

On the other hand, the expansion apparatus 10 further comprises a signal line 40, being connected to the expansion side connection terminal 12, which has the number of lines in conformity to a predetermined video signal standard, a DP power controller 45, and a signal conversion unit 50.

The signal line 40 is electrically connected to the signal line 30 via the PC side connection terminal 23, and applies a video signal output from the GPU 31 to the signal conversion unit 50.

The signal conversion unit 50 receives a video signal in conformity to a predetermined video signal standard from the GPU 31 via the signal line 30, PC side connection terminal 23, expansion side connection terminal 12, and signal line 40. The signal conversion unit 50 converts the video signal in conformity to a predetermined video signal standard that is received from the GPU 31 via the signal line 40, to a video signal in conformity to a video signal standard for each video output terminal of the expansion apparatus 10, and outputs the resultant video signal to each corresponding video output terminal.

For example, when the expansion apparatus 10 has a video output terminal in conformity to a first standard and a second standard, and the GPU 31 outputs a video signal in conformity to a third standard, the signal conversion unit 50, receiving a video signal in conformity to the third standard, converts the video signal in conformity to the third standard to a video signal in conformity to the first standard, and outputs the resultant video signal to the video output terminal in conformity to the first standard. Further, the signal conversion unit 50 converts the received video signal in conformity to the third standard to a video signal in conformity to the second standard, and outputs the resultant video signal to the video output terminal in conformity to the second standard.

When the standard for the video output terminal is the same as the standard for a video signal of the GPU 31, the signal conversion unit 50 outputs a received video signal in the same standard. This is equivalent to that the signal conversion unit 50 outputs a received video signal to a video output terminal without converting the video signal.

Hereinafter, an explanation is given to a case where the expansion apparatus 10 as a typical unit comprises an RGB socket 13, an HDMI socket 14, and a DP socket 15, and the GPU 31 outputs a video signal in conformity to physical layer and logical layer specifications of the DP standard (a video signal in conformity to the DP standard) or a video signal in conformity to a logical layer specification of the HDMI standard via the signal linens 30 and 40 in conformity to the DP standard.

In this case, the signal lines 30 and 40 have at least the numbers in conformity to the DP standard. The numbers of the signal lines 30 and 40 in conformity to the DP standard mentioned here means a total of eleven lines consisting of ten signal lines for transmitting a differential signal (two (sideband) for transmitting a DDC (VESA, Display Data Channel) and one signal line for transmitting a hot plug signal.

In the embodiment, an explanation is given to a case where the signal lines 30 and 40 further include two signal lines for controlling the power supply for the GPU 31 to give an instruction to the DP power controller 45. Thus, the number of the signal lines 30 and 40 become thirteen in total.

The number in conformity to the analog RGB standard is a total of seven lines consisting of three signal lines for transmitting each RGB signal, two Sync signal lines, and two DDC signal lines. The number in conformity to the HDMI standard is a total of eleven lines consisting of eight signal lines for transmitting each a differential signal, two DDC signal lines, and one signal lines for transmitting a hot plug signal.

The DP power controller 45 is controlled by the GPU 31 via two signal lines for controlling the power supply, and controls power supply to the DP socket 15. The signal conversion unit 50 comprises a DP-to-analog RGB conversion integrated circuit (IC) (hereinafter, referred to as an RGB conversion unit) 51, an HDMI bias circuit (hereinafter, referred to as an HDMI conversion unit) 52, and a DP conversion unit 53. The video signal input side (GPU 31 side) of each of the conversion units 51 to 53 is connected to a signal line in conformity to the same video standard as the signal lines 30 and 40. The video signal output side (each of the sockets 13 to 15) of each conversion unit 51 to 53 is connected to a signal line in conformity to the video signal standard for each socket 13 to 15.

The RGB conversion unit (Dp-to-analog RGB conversion IC) 51 converts a video signal in conformity to the DP standard outputted from the GPU 31 to a video signal in conformity to the analog RGB standard, and outputs the resultant video signal to the RGB socket 13.

The RGB conversion unit 51 monitors a potential output from the RGB socket 13. The RGB socket 13 outputs a high-level potential and a low-level potential depending upon whether the RGB plug 101 is connected or not connected. The RGB conversion unit 51 uses the potential outputted from the RGB socket 13 as a connection recognition signal, generates a signal (an HPL_RGB signal) equivalent to a hot plug signal (an HPL_HDMI signal) outputted from the HDMI socket 14 and a hot plug signal (an HPL_DP signal) outputted from the DP socket 15, and outputs the resultant signal to the signal line of the GPU 31 side.

In other words, the RGB socket 13 is configured to output a connection recognition signal to the signal conversion unit 50, when the RGB plug 101 is connected. The HDMI socket 14 and DP socket 15 output a hot plug signal (a connection recognition signal) to the signal conversion unit 50, when the HDMI plug 103 and DP plug 105 are connected. In FIG. 2, a signal line for transmitting a connection recognition signal is indicated by a dotted line for explanation convenience.

The HDMI conversion unit (HDMI bias circuit) 52 adjusts a bias voltage (physical layer information) of a video signal in conformity to a logical layer of the HDMI standard that is outputted from the GPU 31, converts the adjusted video signal to a signal in conformity to a physical layer of the HDMI standard, and outputs the resultant signal to the HDMI socket 14. As a result, the signal outputted from the HDMI conversion unit 52 becomes a video signal in conformity to the physical layer and logical layer of the HDMI standard.

The HDMI conversion unit 52 receives a hot plug signal (an HPL_HDMI signal) output from the HDMI socket 14, and outputs the signal directly to a signal line of the GPU 31 side.

The DP conversion unit 53 is a member that applies a video signal in conformity to the DP standard outputted from the GPU 31 directly to the DP socket 15, and is composed of simple wiring (a signal line) in conformity to the DP standard.

The DP conversion unit 53 receives a hot plug signal (an HPL_DP signal) outputted from the DP socket 15, and outputs the signal directly to a signal line of the GPU 31 side.

A connection recognition signal applied to the signal conversion unit 50 is given to the GPU 31 via the signal line 40, expansion side connection terminal 12, PC side connection terminal 23, and signal line 30.

In the embodiment, an explanation is given to a case where the signal conversion unit 50 alternatively outputs a video signal to each of the socket 13 to 15. In this case, the signal conversion unit 50 includes a switching unit 55.

The switching unit 55 comprises a first multiplexer (first MUX) 56, and a second multiplexer (second MUX) 57.

The first MUX 56 applies a video signal received from the GPU 31 to one of the RGB conversion unit 51 and second MUX 57. The first MUX 56 is given an HPL_RGB signal as a switching control signal that is converted by and outputted from the RGB conversion unit 51 based on a connection recognition signal outputted from the RGB socket 13.

The HPL_RGB signal applied to the first MUX 56 as a switching control signal is given to the first MUX 56 as a switching control signal via a new signal line obtained by branching a signal line for transmitting a hot plug signal included in a signal line connecting the RGB conversion unit 51 and an output terminal of the first MUX 56, for example, to two lines.

FIG. 2 shows a case where the first MUX 56 connects the signal line 40 and RGB conversion unit 51 when the HPL_RGB signal is at a high level (refer to "1" in the first MUX in FIG. 2), and connects the signal 40 and second MUX 57 when the HPL_RGB signal is at a low level (refer to "0" in the MUX 56 in FIG. 2). In the following explanation, "1" is assumed when a connection recognition signal is at a high level, and "0" is assumed when a connection recognition signal is at a low level.

The second MUX 57 applies a video signal received from the first MUX 56 to one of the HDMI conversion unit 52 and DP conversion unit 53. The second MUX 57 is given a connection recognition signal (an HPL_HDMI signal) outputted from the HDMI socket 14 as a switching control signal via the HDMI conversion unit 52.

The HPL_HDMI signal applied to the second MUX 57 as a switching control signal is also given to the second MUX 57 as a switching control signal via a new signal line obtained by branching a signal line for transmitting a hot plug signal included in a signal line connecting the HDMI conversion unit 52 and an output terminal of the second MUX 57, for example, to two lines.

FIG. 2 shows a case where the second MUX 57 connects the first MUX 56 and HDMI conversion unit 52 when the HPL_HDMI signal is at a high level, and connects the first MUX 56 and DP conversion unit 53 when the HPL_RGB signal is at a low level.

(2) Operation when connection of the RGB socket 13 is given top priority FIGS. 3A and 3B show examples of operation of the signal conversion unit 50 when connection of the RGB socket 13 is given top priority. FIG. 3A is an explanation drawing showing an example of operation of the signal conversion unit 50 when connection of the HDMI socket 14 realized by the expansion apparatus 10 shown in FIG. 2 is prioritized over connection of the DP socket 15. FIG. 3B is an explanation drawing showing an example of operation of the signal conversion unit 50 when connection of the DP socket 15 is prioritized over connection of the HDMI socket 14.

(2-1) When connection of the HDMI socket 14 is prioritized over connection of the DP socket 15

As shown in FIG. 2 and FIG. 3A, in the configuration shown in FIG. 2, connection of the RGB socket 13 is given top priority, and connection of the HDMI socket 14 is prioritized over connection of the DP socket 15. In particular, when the RGB plug 101 is connected to the RGB socket 13 and an HPL_RGB signal is applied to the first MUX 56 (a HPL_RGB signal is at a high level "1"), a video signal received from the GPU 31 is applied to the RGB conversion unit 51 regardless of the connection states of the other sockets 14 and 15, and converted to a video signal in conformity to the analog RGB standard, and applied to the RGB socket 13.

When the RGB plug 101 is not connected to the RGB socket 13 in a state of an HPL_RGB signal being not applied to the first MUX 56 (a HPL_RGB signal is at a low level "0") while the HDMI plug 103 is connected to the HDMI socket 14 with an HPL_HDMI signal being applied to the second MUX 57 (an HPL_HDMI signal is at a high level "1"), a video signal received from the GPU 31 is applied to the HDMI socket 14 regardless of the connection state of the DP socket 15, and converted to a video signal in conformity to the HDMI standard, and applied to the HDMI socket 14.

For example, a consideration can be made such that the RBG plug 101 is connected to the RGB socket 13. In this case, as the HPL_RGB signal is "1", the first MUX 56 connects the signal line 40 and RGB conversion unit 51 regardless of the connection states of the other sockets 14 and 15. As a result, the signal line 40 is electrically connected to the RGB socket 13. On the other hand, the signal line 40 is disconnected from the other sockets 14 and 15.

Thus, the RGB socket 13 is electrically connected to the GPU 31 of the notebook PC 20 via the RGB conversion unit 51 and first MUX 56. Therefore, the HPL_RGB signal, which is generated by the RGB conversion unit 51 based on the connection recognition signal output from the RGB socket 13, would be applied to the GPU 31.

Receiving the HPL_RGB signal, the GPU 31 receives information that the external display unit 102 connected to the RGB socket 13 is a display unit in conformity to the RGB standard. This can be accomplished by receiving data of EDID (Extended Display Identification Data) format, for example, from the external display unit 102 via the DDC signal line. And, the GPU 31 outputs a video signal in conformity to the DP standard via the signal line 30 in conformity to the DP standard. The video signal is applied to the RGB conversion unit 51 where it is converted to a video signal in conformity to the analog RGB standard so as to be outputted to the RGB compatible external display unit 102 via the RGB socket 13 and RGB plug 101.

Further, for example, another consideration can be made such that only the HDMI plug 103 is connected to the HDMI socket 14 out of the sockets 13 to 15 while any other plug is connected neither to the socket 13 nor the socket 15. In this case, the HPL_RGB signal is "0" and the HPL_HDMI signal is "1". Thus, the first MUX 56 connects the signal line 40 and MUX 57, and the second MUX 57 connects the first MUX 56 and HDMI conversion unit 52.

Thus, the HDMI socket 14 is electrically connected to the GPU 31 of the notebook PC 20 via the HDMI conversion unit 52, second MUX 57, and first MUX 56. Therefore, the HPL_HDMI signal outputted from the HDMI socket 14 is applied to the GPU 31. Receiving the HPL_HDMI signal, the GPU 31 receives information that the external display unit 104 connected to the HDMI socket 14 is a display unit in conformity to the HDMI standard, by data of EDID (Extended Display Identification Data) format, for example, from the external display unit 104 via the DDC signal line.

In this way, the GPU 31 outputs a video signal in conformity to a logical layer of the HDMI standard via the signal line 30 in conformity to the DP standard. The video signal is applied to the HDMI conversion unit 52, adjusted a bias voltage (information on a physical layer), converted to a video signal in conformity to a physical layer of the HDMI standard, and outputted to the HDMI compatible external display unit 104 via the HDMI socket 14 and HDMI plug 103.

Further, still another consideration can be made such that the DP plug 105 is connected only to the DP socket 15 out of the sockets 13 to 15, for example, while any other plug is connected neither to the sockets 13 nor the socket 14. In this case, the HPL_RGB signal is "0" and the HPL_HDMI signal is "0". Thus, the first MUX 56 connects the signal line 40 and MUX 57, and the second MUX 57 connects the first MUX 56 and DP conversion unit 53.

Thus, the DP socket 15 is electrically connected to the GPU 31 of the notebook PC 20 via the DP conversion unit 53, second MUX 57, and first MUX 56. Therefore, the HPL_DP signal outputted from the DP socket 15 is applied to the GPU 31. Receiving the HPL_DP signal, the GPU 31 receives information such that the external display unit 106 connected to the DP socket 15 is a display unit in conformity to the DP standard, which is determined, for example, by EDID (Extended Display Identification Data) format obtained from the external display unit 106 via the DDC signal line.

In this way, the GPU 31 outputs a video signal in conformity to the DP standard via the signal line 30 in conformity to the DP standard. The video signal is applied to the DP conversion unit 53, given to the DP socket 15 as it is, and outputted to the DP compatible external display unit 106 via the DP socket 15 and DP plug 105.

(2-2) When connection of the DP socket 15 is prioritized over connection of the HDMI socket 14 As shown in FIG. 3B, when an HPL_DP signal is used instead of the HPL_HDMI signal applied to the second MUX 57 as a switching control signal in the configuration shown in FIG. 2, connection of the RGB socket 13 is given top priority, and connection of the DP socket 15 is prioritized over connection of the HDMI socket 14.

When the signal conversion unit 50 alternatively outputs a video signal to each of the sockets 13 to 15, a connection priority of the sockets 13 to 15 can be optionally set by a method of connecting the switching unit 55 to each of the conversion units 51 to 53, and by a switching control signal with respect to the switching unit 55.

Figure 4:
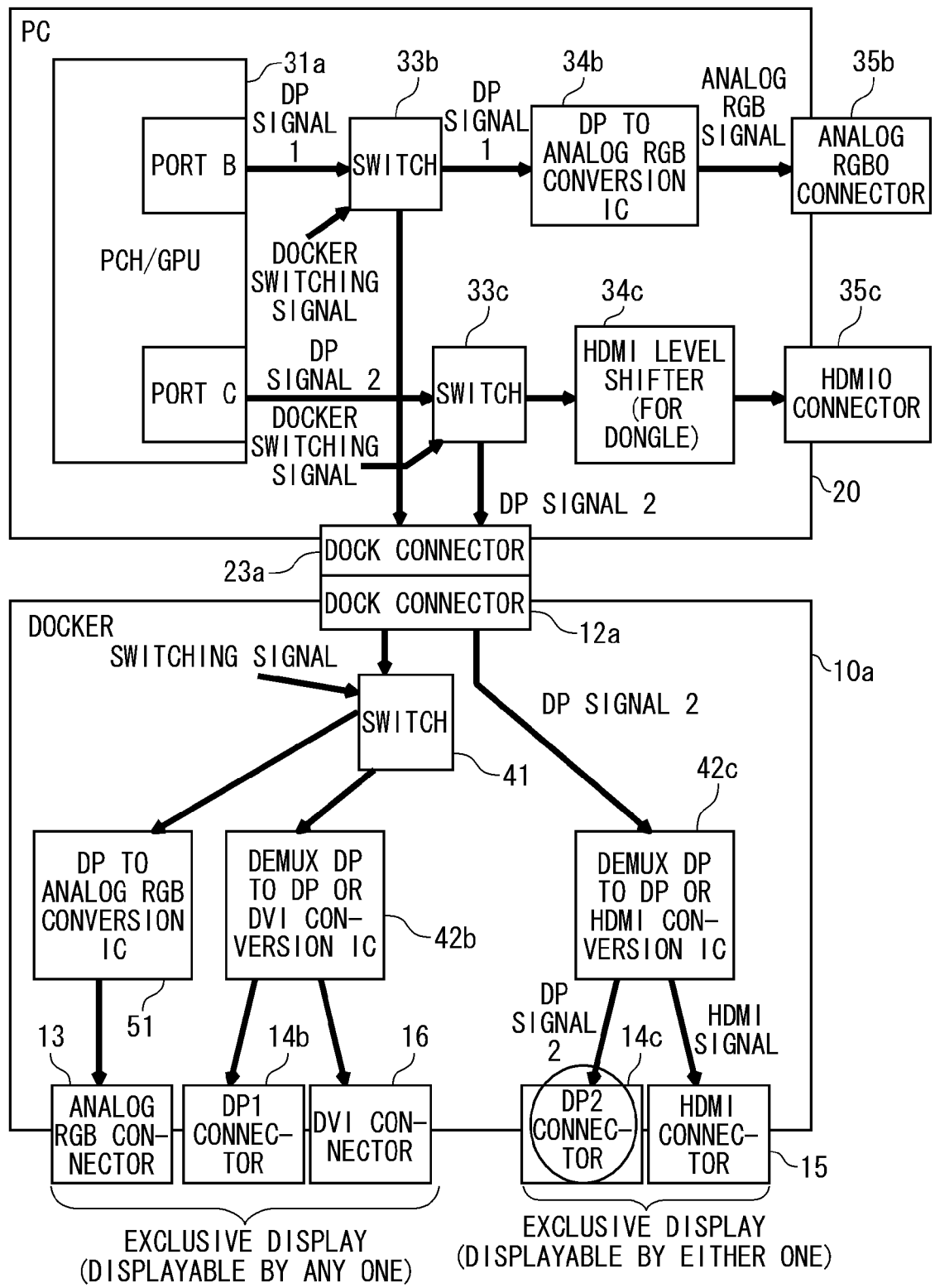
FIG. 4 shows an example of the embodiment (when an HDMI model/Docker is connected, and when a monitor is connected to a DP2 connector).

(3) Functional configuration and operation of the embodiment FIG. 4 shows an example of the embodiment showing a state that an HDMI model of PC is connected to an expansion apparatus 10 (hereinafter, referred to as a Docker). In FIG. 1 and FIG. 2, the parts designated by same reference numerals are functionally corresponding. As a typical model, a DP model and an HDMI model are known. When one more connector for an external display unit is provided in addition to an analog RGB connector, for example, the former has a DP connector, and the latter has an HDMI connector.

In FIG. 4, a PCH/GPU 31a is a part having a function of a platform controller hub (PCH) in addition to the GPU 31. A PCH is a chip that integrates I/O controller functions of various devices, for example. The main controller 32 outputs a switching control signal to switches and MUXs via a PCH and via a not-shown general purpose input/output (GPIO), according to the instruction information entered by a user.

The PCH/GPU 31a (CPU/(i)GPU) can be configured so that when the GPU is externally attached to the main controller 32, a video signal of a display screen generated by the GPU, which is an information processing apparatus of the embodiment, is outputted from the GPU, and when the GPU is incorporated in the main controller 32, the video signal is output from the PCH.

Figure 5:
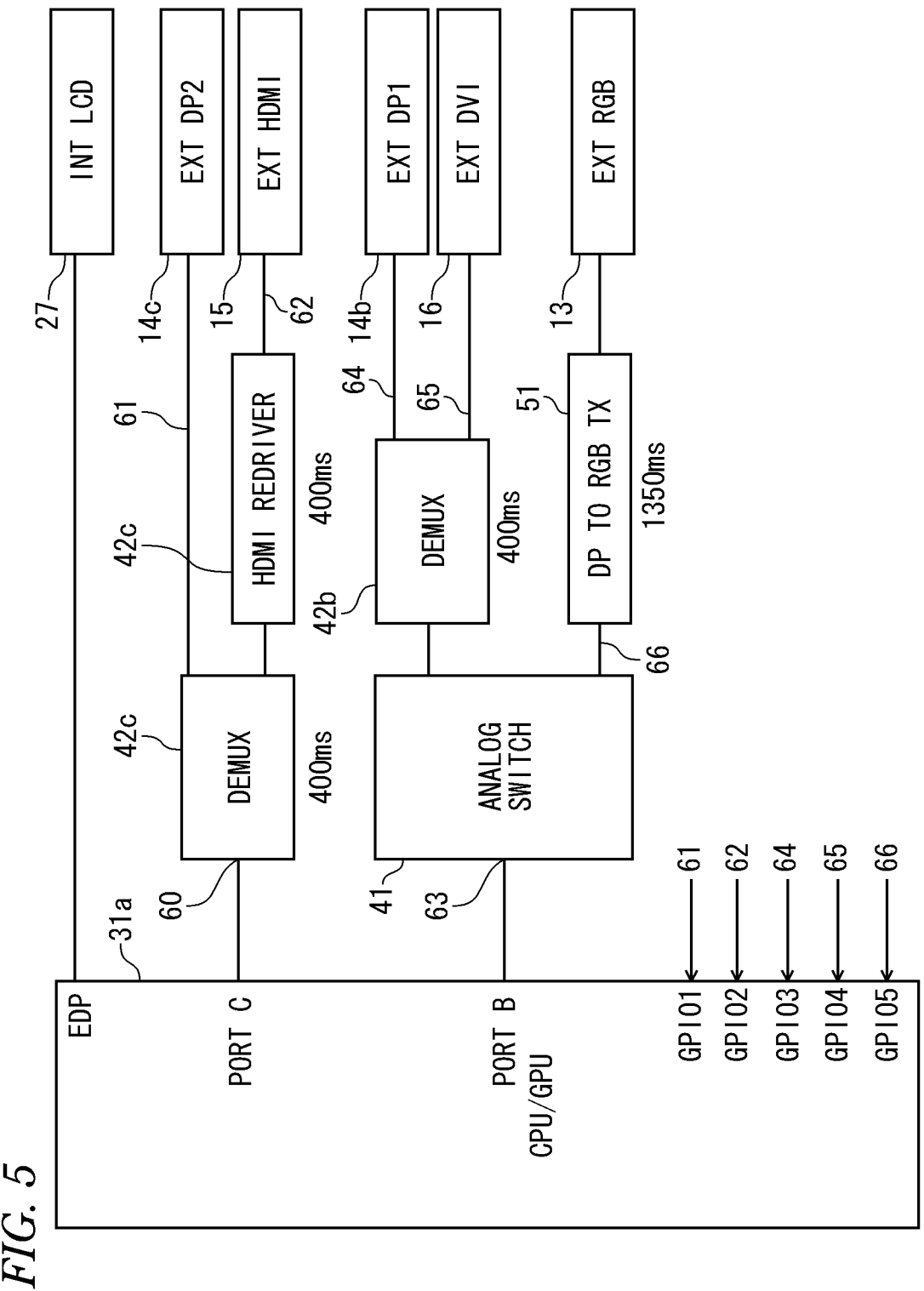
FIG. 5 is a connection block diagram of a GPU and a display unit used in the embodiment.

In FIG. 4, a port A, which outputs a signal to an internal LCD constituting a display panel 27, is omitted. FIG. 5 shows a block diagram of a display unit. The components designated by the same reference numerals as those in FIG. 4 are functionally corresponding. The drawing shows an example that a display output from the CPU/iGPU is transmitted in three channels of DP for an internal LCD, and port B/Port C for digital display output.

Further, in a system corresponding to a docking apparatus, for example, an output to the Port B is branched to display units DP1, DVI and RGB, and an output to the Port C is branched to DP2 and HDMI, and is displayed for a display unit connected by a user (when two or more units are connected to the same port, an appropriate one is selected according to the priority. Compared with FIG. 4, the switches 33b and 33c, and Dock connectors 23a and 12a are omitted.

It takes 400 ms for the DeMux 42b/42c and HDMI ReDriver 42c (a part of 42c) to return a hot plug signal to the upstream (the GPU side) after a display unit is connected. It takes 1,350 ms for the DP to RGB T x 51 to return a hot plug signal after an RGB is connected. Thus, time required to detect a display unit after it is connected is as shown in FIG. 6.

FIG. 7 shows a startup display unit priority in BIOS and a display priority of each unit. For example, when "Auto Select" has been selected in BIOS setting, a logo and BIOS password window at startup of BIOS are detected and displayed in the order of LCD, DP, HDMI, DVI, and RGB.

In this case, when a LID (a lid of a display panel (DP) 27) is closed, a logo and a password are displayed in the DP. When the DP is not connected, the display priority shifts to HDMI. Likewise, when an HDMI is not connected, the display priority shifts to DVI. When a DVI is not connected, the priority shifts to RGB. When an RGB is not outputted, even if the LID is closed, a logo and a password are displayed in the LCD (actually, not displayed until the LID is opened).

Figure 8:
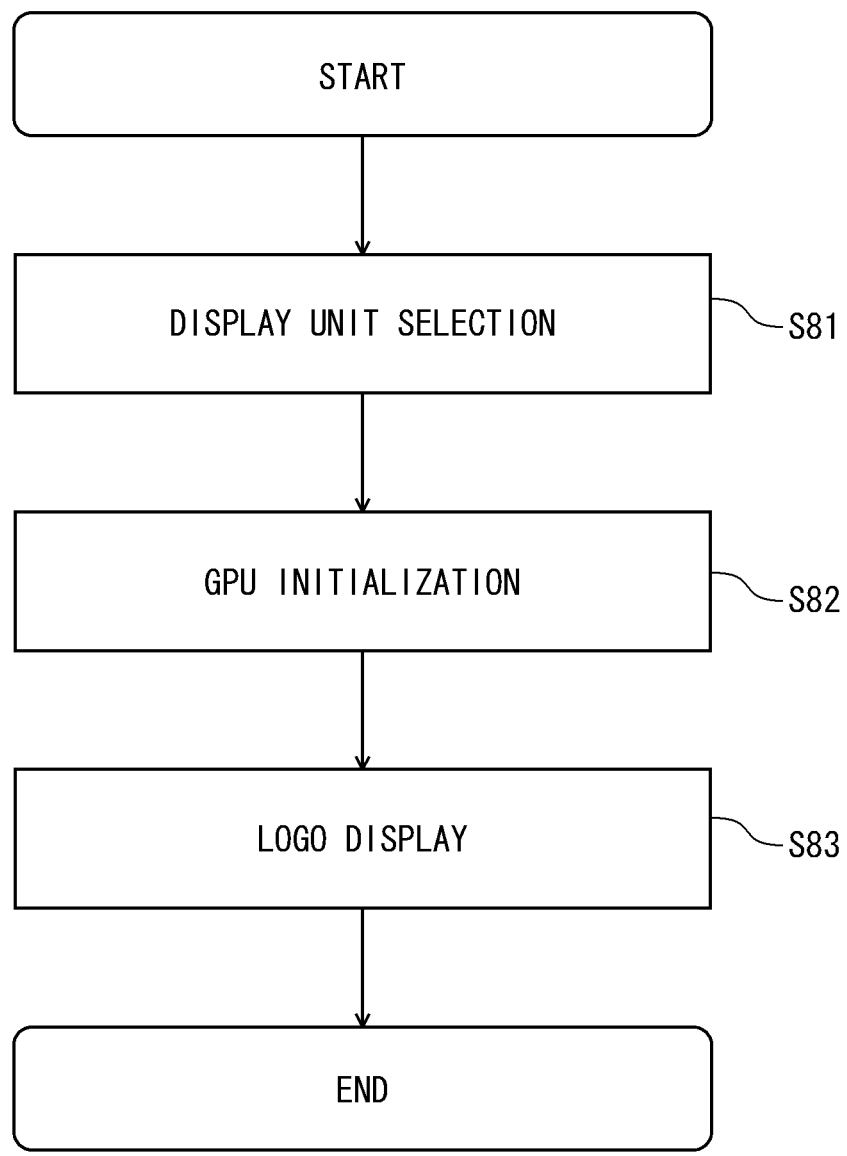
FIG. 8 is a BIOS display related processing flowchart outline used in the embodiment.

The BIOS performs initialization and display according to the flowchart of FIG. 8 (only the operations related to a display unit are described). A display unit to display a logo is required to be detected and defined at the time of "Display unit selection". For example, when Auto Select has been selected, the display unit selection operation (step S 81) is performed in the following sequence.

(1) When the LID has been opened, select LCD.
(2) Wait for 400 ms after the power is turned on, check whether a DP is connected, and select a DP when a DP has been connected.
(3) Wait for 800 ms after the power is turned on, check whether an HDMI is connected, and select HDMI when an HDMI has been connected.
(4) Wait for 400 ms after the power is turned on, check whether a DVI is connected, and select DVI when a DVI has been connected.
(5) Wait for 1350 ms after the power is turned on, check whether an RGB is connected, and select RGB when an RGB has been connected.
(6) When all external display units are not connected, select LCD.

By performing such operations, it becomes possible to securely detect an external display device connected at the time of turning on the system power supply, to select optimum conditions according to BIOS setting, external display unit, and LID open/close conditions, to initialize the GPU (step S82) in a display unit that a user wants to use in the shortest possible time, and to display a logo window (step S83).

(Second Embodiment)

A second embodiment will be explained with reference to FIG. 5. Explanations on the parts common to the first embodiment will be omitted.

In the first embodiment, connection of each display unit is detected by an HPD signal on buses 60 and 63, for example. Thus, at the timing where an HPD signal is asserted, the ReDriver IC 42c and protocol conversion IC are ready to display, and a logo displaying processing can be made possible immediately after an HPD signal is asserted and detected. Although the number of branches becomes less, it is necessary to wait for completion of initialization of the ReDriver IC 42c and protocol conversion IC, regardless of whether an external unit is connected or not.

As a second embodiment, there is a method of using GPIO1 to GPIO5 in FIG. 5 for checking connection. GPIO1 to GPIO4 branches and connects HPD signals on display I/F buses 61 to 65, respectively. Unlike the HPD signals on the buses 60 and 63 in the first embodiment, these HPD signals are the HPD signals before passing through the ReDriver IC 42c and protocol conversion IC, and are not affected by the initialization time of these ICs, and asserted immediately after an external display unit is connected. Therefore, it is possible to determine whether an external display unit is connected, in an earlier stage than in the first embodiment.

In this case, when Auto Select has been selected according to a startup display unit priority in BIOS, for example, the display unit selection operation is performed in the following sequence.
(1) When the LID has been opened, select LCD.
(2) Check whether a DP is connected on GPIO1 and GPIO3, and when a DP has been connected, wait for 400 ms after the power is turned on, and select DP.
(3) Check whether an HDMI is connected on GPIO2, and when an HDMI has been connected, wait for 800 ms after the power is turned on, and select HDMI.
(4) Check whether a DVI is connected on GPIO4, and when a DVI has been connected, wait for 400 ms after the power is turned on, and select DVI.
(5) Wait for 1,350 ms after the power is turned on, check whether an RGB is connected, and select RGB when an RGB has been connected.
(6) When all external display units are not connected, select LCD.

For example, in the condition that the LID is closed and only a DVI has been connected, in the first embodiment, the operation of waiting for 800 ms is necessary for waiting until an HDMI having a higher priority than a DVI is detected. In the second example, connection of a DP/HDMI can be checked without a wait processing, and display is possible only by waiting for 400 ms until initialization of a DeMus on a DVI is completed. Thus, compared with the first example, the startup time can be reduced by 400 ms.

(Third Embodiment)

Figure 9:
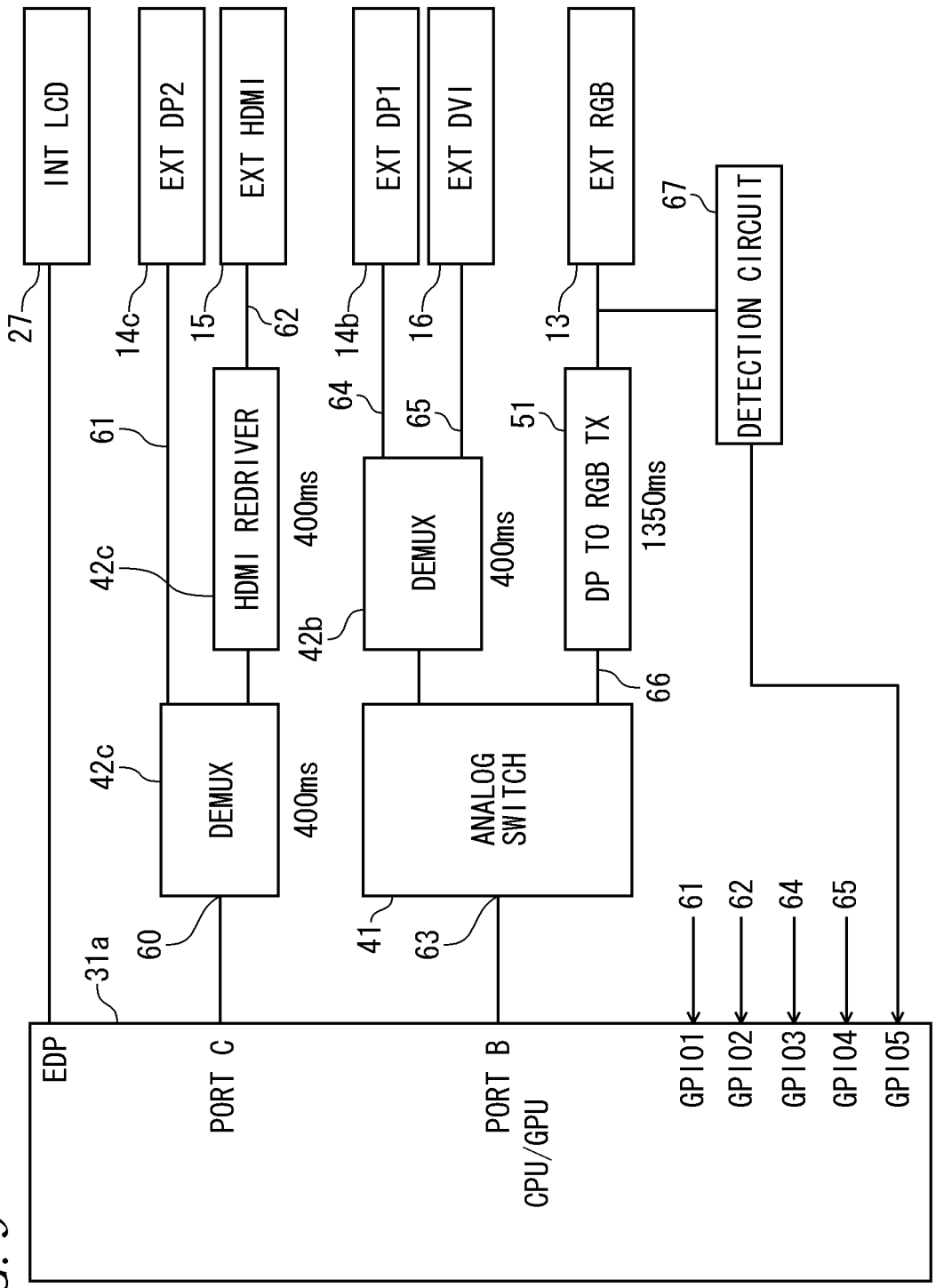
FIG. 9 is a block diagram showing a third embodiment provided with an additional analog RGB detection circuit that is used in other embodiments.

A third embodiment will be explained with reference to FIG. 9. Explanations on the parts common to the first and second embodiments will be omitted.

As the drawbacks of the first and second embodiments, there is a problem that 1,350 ms is required to wait for detecting an analog RGB display unit. In the third embodiment, by mounting an analog RGB detection circuit (an RGB signal load detection circuit or the like), it is possible to eliminate a waiting time for detecting an analog RGB unit. In the third embodiment, when an RGB has been selected in a startup display unit priority in BIOS, the display unit selection operation is performed in the following sequence.
(1) Check whether a RGB is connected on GPIO5, and when a RGB has been connected, wait for 1,350 ms after the power is turned on, and select RGB.
(2) When the LID has been opened, select LCD.
(3) Check whether a DP is connected on GPIO2 and GPIO3, and when a DP has been connected, wait for 400 ms after the power is turned on, and select DP.
(4) Check whether an HDMI is connected on GPIO2, and when an HDMI has been connected, wait for 800 ms after the power is turned on, and select HDMI.
(5) Check whether a DVI is connected on GPIO4, and when a DVI has been connected, wait for 400 ms after the power is turned on, and select DVI.
(6) When all external display units are not connected, select LCD.

When an RGB has been specified as a priority display unit, in the first and second embodiments, it is necessary to execute a wait processing with 1,350 ms for detecting the RGB, regardless of whether the RGB is present or not. Thus, even when an RGB is specified as a priority unit and an RGB is not connected, the operation of waiting 1,350 ms is necessary. On the other hand, in the third embodiment, connection of an RGB can be checked without the waiting operation, and the next operation can be immediately started when an RGB has not been connected, and the BIOS startup time can be reduced.

As described above, displaying a logo in a display unit set by a user can be done within the minimum time for activating the display unit. This is accomplished by indicating a priority order of display units at booting in BIOS setting, determining connection of display units in the order of the priority based on the indicated priority order, executing a wait processing with the time required for recognizing connection, executing another wait processing with the time required for displaying after recognizing connection, and introducing BIOS processing steps for executing the display operation.

We have explained the BIOS processing steps for executing the display operation by specifying a priority order of display units at booting in BIOS setting, determining connection of display units in order of priority based on the specified priority order, wait processing with the time required for recognizing connection, and wait processing with the time required for displaying after recognizing connection.

Further, we have explained the circuit configuration to reduce the time required for determining connection of an external display unit, in which when a display output of GPU is applied to an external display unit via a ReDriver IC or a protocol conversion IC, an HPD signal (High when any display unit is connected/Low when no display unit is connected) is generated in a part closer to an external display unit, and a connection state is monitored on a GPIO of the system.

Further, we have explained the BIOS processing steps for detecting whether a LID is opened and whether a dock is present, and for reducing the above processing time. It is to be noted that the invention is not limited to the embodiments described hereinabove. The invention may be embodied in other specific forms, and may be modified without departing from its spirit and essential characteristics.

The invention may be embodied in other specific forms by appropriately combining the constituent elements disclosed in the embodiments described above. For example, some constituent elements may be deleted from the entire constituent elements shown in the embodiments. Further, the invention may be embodied by appropriately combining the constituent elements related to different embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a Basic Input and Output System (BIOS);
a setting circuit configured to set a display priority order at booting in the BIOS;
a determination circuit configured to determine whether display units are connected, in order of priority based on the display priority order; and
a display control circuit configured to perform one or more wait processing operations based on the connection determination and to execute a display operation.

2. The information processing apparatus according to claim 1, further comprising:
 a general-purpose input/output (GPIO) configured to monitor a connection state of a display unit by a hot plug detect (HPD) signal from said display unit,
 wherein a time required to determine connection of the display unit is based on the monitoring result of the GPIO.

3. The information processing apparatus according to claim 1, further comprising:
 a detection circuit configured to detect whether a lid of a display unit (LID) is opened or closed and whether a dock is present,
 wherein a time required to determine connection of the display unit is based on the detection result of the detector.

4. An output control method in an information processing apparatus including a Basic Input and Output System (BIOS), comprising:
 setting a display priority order at booting in the BIOS;
 determining whether display units are connected, in order of priority based on the display priority order;
 performing one or more wait processing operations based on the connection determination; and
 executing a display operation.

5. An information processing apparatus including a screen display output, comprising:
 a control program;
 a setting circuit configured to set a display priority order at booting in the control program;
 a determination circuit configured to determine whether display units are connected, in order of priority based on the display priority order; and
 a display control circuit configured to perform one or more wait processing operations based on the determination that display units are connected and to execute a display operation.

6. The information processing apparatus according to claim 5, further comprising:
 a general-purpose input/output (GPIO) configured to monitor a connection state of a screen display output by a hot plug detect (HPD) signal from said screen display output,
 wherein a time required to determine connection of the screen display output is based on the monitoring result of the GPIO.

7. The information processing apparatus according to claim 5, further comprising:
 a detection circuit configured to detect whether a lid of a display unit (LID) is opened or closed and whether a dock is present,
 wherein a time required to determine connection of a screen display output is based on the detection result of the detector.

* * * * *